March 20, 1962     O. S. BECKHAM     3,025,841
CAM FOLLOWER AND SPACER FOR ENGINE VALVES
Filed Oct. 17, 1960
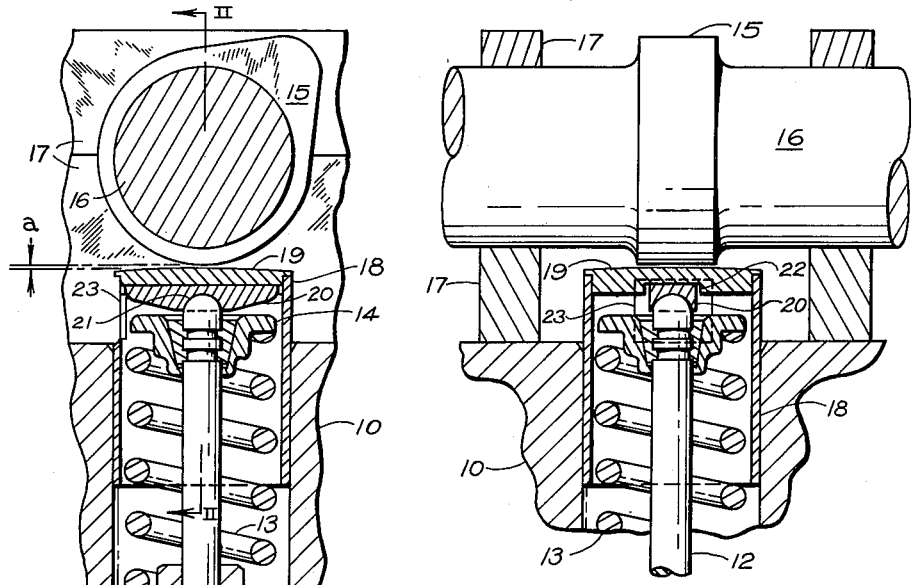
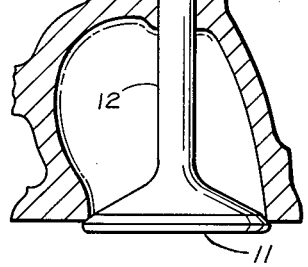
Fig. 1.
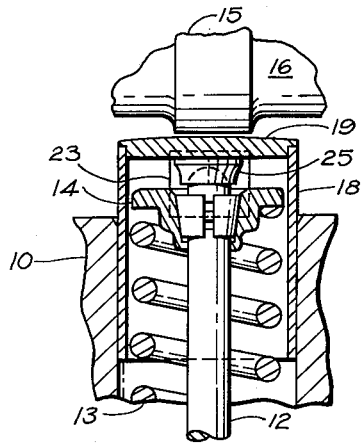
Fig. 3.
INVENTOR.
OSCAR S. BECKHAM
BY
ATTORNEYS 3,025,841
CAM FOLLOWER AND SPACER FOR
ENGINE VALVES
Oscar S. Beckham, East Peoria, Ill., assignor to Caterpillar Tractor Co., Peoria, Ill., a corporation of California
Filed Oct. 17, 1960, Ser. No. 62,936
1 Claim. (Cl. 123—90)

This invention relates to cam followers and spacers for use particularly in engines of the overhead valve type.

In overhead valve engines space for adjustable cam followers is limited and various devices such as shim packs have been employed for establishing initial spacing when the engine is assembled and compensating for wear resulting from engine operation. Such devices are subject to work hardening and breakage and are relatively complex and difficult to service.

It is an object of the present invention to provide a small durable spacer for use between a valve and cam follower which actuates it and to provide a spacer which is easily installed and serviced.

Further objects and advantages are made apparent in the following specification by reference to the accompanying drawing which illustrates the cam follower and spacer of the invention.

In the drawing:

FIG. 1 is a fragmentary sectional view of a portion of an engine head block showing a valve in partial section therein;

Fig. 2 is a fragmentary section taken on the line II—II of FIG. 1; and

FIG. 3 is a section similar to FIG. 2 showing a modified form of the invention.

A portion of a head block is shown at 10 in FIG. 1 as having the usual poppet valve 11 which may be either the intake or exhaust valve of the engine. A stem 12 of the valve is guided in the usual manner and extends through a bore which houses a spring 13 bearing upwardly against a spring seat 14 adjacent the end of the stem to retain the valve in closed position. The valve is opened by a cam 15 on a cam shaft 16 rotatable in bearing blocks 17 secured to the top of the head block in any suitable manner. The cam shaft is rotatable during operation of the engine through conventional means to effect timed opening of the valve in a manner which is well known. A cam follower of generally cylindrical contour shown at 18 is guided for reciprocal movement in the bore of the spring housing and has a head 19 engageable by the lobe of the cam to urge it downwardly against the force of the spring and open the valve. Very precise spacing is required between the small dimension of the cam 15 and the head 19 to insure smooth operation, and complete closing of the valve and this space is illustrated in exaggeration by the broken lines "a" in FIG. 1. The space "a" is established in accordance with the present invention by a spacer shown at 20 which is of elongated rectangular shape with a central depression of spherical contour shown at 21 which fits the end of the valve stem, also spherically contoured, when the flat side of the spacer rests against the inner surface of the follower head 19. The follower head is preferably grooved as shown at 22 in FIG. 2 for reception of the spacer and to cause the spacer to move with the follower if it rotates in operation to insure even wear. This also insures against maladjustment in the event that the surface of the follower is not true. A window or opening 23 is provided in the cylindrical wall of the follower to permit insertion and removal of the spacer.

In assembling an engine the valve, spring, follower and cam shaft are assembled in their operative positions without the spacer 20 and with the follower resting on the end of the valve stem. The space between the outer surface of the follower and the minimum diameter of the cam is then measured, as for example with a feeler gauge, and a spacer of proper thickness to provide the desired space "a" is then inserted through the window 23. As best seen in FIG. 1 the surface of the spacer with the depression 21 is inclined toward its outer ends so as to form a wedge which facilitates insertion of the spacer and once its end is disposed between the follower and the valve stem forcing it inwardly will cause it to snap into place where it is retained by the end of the valve stem under pressure of the spring.

Spacers of the kind herein described have proven remarkably durable and in small engines will not need replacement over a very long period of time. However, if due to wear between the cam surface and follower, the space "a" becomes enlarged a larger spacer may be inserted to compensate for this wear. This is very easily accomplished without removing the cam shaft or valve assembly and disturbing the timing of the engine. To accomplish this the cam shaft is rotated until the lobe of the cam opens the valve and the valve is then blocked in open position while the cam shaft is turned to remove its lobe from the follower. The follower may then be raised to permit easy removal of the spacers 20 and insertion of a replacement part through the window 23.

A modified form of spacer is shown in FIG. 3 at 25. In this figure the other parts of the valve assembly are identical with those shown in FIGS. 1 and 2 but the spacer is of circular type known in connection with valve assemblies as an elephant's foot button and need not be guided as by the groove 22 shown in FIGS. 1 and 2.

I claim:

In combination with a poppet valve having a stem, a reciprocable follower positioned to actuate the stem to open the valve and a rotatable cam for actuating the follower, a spacer between the follower and the stem comprising a member having a relatively flat side for engagement with the follower and an opposite side having a depression of spherical contour, the end of said valve stem being spherically contoured to seat in said depression, and said spacer having a surface inclined from said depression toward its edge to facilitate its insertion between the follower and the stem.

References Cited in the file of this patent
UNITED STATES PATENTS

| | | |
|---|---|---|
| 1,210,621 | Fekete | Jan. 2, 1917 |
| 1,565,223 | Church | Dec. 8, 1925 |
| 2,817,326 | Taylor | Dec. 24, 1957 |
| 2,863,432 | O'Brien | Dec. 9, 1958 |
| 2,954,016 | Leese | Sept. 27, 1960 |
| 2,966,901 | Stwiorok | Jan. 3, 1961 |